United States Patent
Hollen et al.

(10) Patent No.: US 12,208,894 B2
(45) Date of Patent: Jan. 28, 2025

(54) INLET COVER MECHANISM

(71) Applicant: The Boeing Company, Arlington, VA (US)

(72) Inventors: Keith Ryan Hollen, Saint Charles, MO (US); Bryan Michael Loris, Saint Charles, MO (US); Nathan Matthew Knibb, Manchester, MO (US); Everett Ryan Eaton, Saint Charles, MO (US); Michael L. Oleshchuk, Saint Charles, MO (US)

(73) Assignee: The Boeing Company, Arlington, VA (US)

( * ) Notice: Subject to any disclaimer, the term of this patent is extended or adjusted under 35 U.S.C. 154(b) by 56 days.

(21) Appl. No.: 18/184,359

(22) Filed: Mar. 15, 2023

(65) Prior Publication Data
US 2024/0308645 A1    Sep. 19, 2024

(51) Int. Cl.
*B64C 7/00*    (2006.01)
*B64F 5/10*    (2017.01)

(52) U.S. Cl.
CPC . *B64C 7/00* (2013.01); *B64F 5/10* (2017.01)

(58) Field of Classification Search
CPC ... B64C 7/00; B64F 5/10; B64F 1/005; B64D 2033/022; F02C 7/04
See application file for complete search history.

(56) References Cited

U.S. PATENT DOCUMENTS

| | | | | |
|---|---|---|---|---|
| 3,646,980 | A * | 3/1972 | Peterson | B64F 1/005 244/129.4 |
| 5,660,357 | A * | 8/1997 | Grossman | B64D 33/02 102/293 |
| 6,089,824 | A * | 7/2000 | Soares | F02C 7/055 415/121.2 |
| 7,625,415 | B2 * | 12/2009 | Durocher | B01D 39/12 55/306 |
| 8,528,312 | B1 * | 9/2013 | Shammoh | B64D 33/04 60/39.35 |
| 8,651,415 | B1 * | 2/2014 | Sparks | B64D 45/00 244/121 |
| 8,777,154 | B2 * | 7/2014 | Alexander | B64F 1/005 89/1.817 |
| 9,446,857 | B2 * | 9/2016 | Sparks | B64F 1/005 |
| 10,450,891 | B2 * | 10/2019 | Korn | F01D 25/285 |
| 11,377,224 | B2 * | 7/2022 | Cantin | B64D 33/02 |
| 11,772,812 | B1 * | 10/2023 | Caban, II | B64F 1/005 150/157 |
| 11,976,612 | B2 * | 5/2024 | Bovankovich | B64G 1/005 |
| 2008/0135677 | A1 * | 6/2008 | Oleshchuk | B64C 27/24 244/17.11 |
| 2009/0223184 | A1 * | 9/2009 | Pavlatos | B01D 45/14 55/306 |

(Continued)

*Primary Examiner* — Medhat Badawi
(74) *Attorney, Agent, or Firm* — Yee & Associates, P.C.

(57) ABSTRACT

An inlet cover mechanism for an air launched vehicle includes a quick release pin, a chassis, a collar, and a piston pin. The inlet cover mechanism facilitates attachment and deployment of an inlet cover with the air launched vehicle. The quick release pin is connected to the inlet cover. The chassis is connected to the air launched vehicle. The collar is connected to the chassis and is releasably engageable with the quick release pin. The piston pin is slidably engaged within the chassis and is configured to contact the quick release pin.

18 Claims, 6 Drawing Sheets

(56) References Cited

U.S. PATENT DOCUMENTS

| | | | | |
|---|---|---|---|---|
| 2010/0282055 | A1* | 11/2010 | Jansson | F41F 3/077 |
| | | | | 89/1.817 |
| 2011/0108676 | A1* | 5/2011 | Colaprisco | F02C 7/052 |
| | | | | 244/53 B |
| 2014/0008497 | A1* | 1/2014 | Alexander | B64F 1/005 |
| | | | | 60/39.093 |
| 2014/0245665 | A1* | 9/2014 | Sparks | B64F 1/005 |
| | | | | 49/34 |
| 2014/0331682 | A1* | 11/2014 | Bovankovich | B64G 1/005 |
| | | | | 60/768 |
| 2015/0089879 | A1* | 4/2015 | Sparks | B64F 1/005 |
| | | | | 49/460 |
| 2019/0300199 | A1* | 10/2019 | Hausmann | G01V 3/081 |
| 2020/0025150 | A1* | 1/2020 | Bovankovich | B64G 1/005 |
| 2022/0177107 | A1* | 6/2022 | Kim | B64B 1/58 |
| 2022/0372932 | A9* | 11/2022 | Bovankovich | B64D 39/00 |
| 2023/0234720 | A1* | 7/2023 | Martin | F02C 7/04 |
| 2024/0141854 | A1* | 5/2024 | Ching | F02M 35/024 |
| 2024/0190583 | A1* | 6/2024 | Labas | B64F 1/005 |
| 2024/0198975 | A1* | 6/2024 | Chaudhari | B60R 11/00 |
| 2024/0263563 | A1* | 8/2024 | Hausmann | F01D 21/14 |
| 2024/0301844 | A1* | 9/2024 | Bovankovich | B64D 39/00 |
| 2024/0308645 | A1* | 9/2024 | Hollen | B64F 5/10 |
| 2024/0310150 | A1* | 9/2024 | Fukushima | B01J 7/00 |

* cited by examiner

INLET COVER MECHANISM

BACKGROUND INFORMATION

1. Field

The present disclosure relates generally to air launched vehicles. More specifically, the present disclosure relates to a system for attaching and deploying an inlet cover of an air launched vehicle.

2. Background

Air launched vehicles are carried on a host aircraft until the need arises for deployment. Some air launched vehicles include an engine with air inlets. Some other air launch vehicles have special electronics that need to be exposed after release. While being carried on the host vehicle, the air inlets for the engine of the air launched vehicle need to be covered to prevent ingestion of debris and to continue the aerodynamic outer mold line of the air launched vehicle. Once the air launched vehicle is jettisoned from the host aircraft, the air inlets of the air launched vehicle need to be uncovered in order for the engine of the air launched vehicle to be ignited.

Typical deployable aerodynamic covers can produce foreign object debris (FOD) that might be ingested in the air inlets of the air launched vehicles engine. Further, they are large, expensive to manufacture or operate, or are tied to another mechanism of or deployment of the host vehicle or air launched vehicle. Additionally, the components of typical deployable covers may interfere with the aerodynamic mold line of the air launched vehicle and/or may infringe on fuel storage space of the air launched vehicle.

Therefore, it would be desirable to have a method and apparatus that takes into account at least some of the issues discussed above, as well as other possible issues.

SUMMARY

An illustrative embodiment of the present disclosure provides an inlet cover deployment apparatus for an air launched vehicle comprising a quick release pin, a chassis, a collar, and a piston pin. The quick release pin is connected to an inlet cover of an air launched vehicle. The chassis is connected to the air launched vehicle. The collar is connected to the chassis and is releasably engageable with the quick release pin. The piston pin is slidably engaged within the chassis and is configured to contact the quick release pin.

Another illustrative embodiment of the present disclosure provides a system for attaching and deploying an inlet cover of an air launched vehicle comprising an inlet cover, a quick release pin, a chassis, a collar, and a piston pin. The quick release pin is connected to the inlet cover. The chassis is connected to an air launched vehicle. The collar is connected to the chassis in a first bore of the chassis. The piston pin is seated in a second bore of the chassis and is axially aligned with the quick release pin. The quick release pin is releasably engageable with an interior shoulder of the collar A further illustrative embodiment of the present disclosure provides a method for attaching and deploying an inlet cover of an air launched vehicle. The method includes a step of attaching a quick release pin to an inlet cover. The method includes a step of connecting a chassis to an air launched vehicle. The method includes a step of positioning a piston pin with the chassis. The method includes a step of connecting a collar to the chassis to retain the piston pin within the chassis. The method further includes a step of engaging the quick release pin with the collar to attach the inlet cover to the air launched vehicle. The method also includes a step of moving the piston pin through the chassis to contact the quick release pin and disengage the quick release pin from the collar to deploy the inlet cover.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an air-breathing, self-powered air launched vehicle requires the need of a deployable cover in order to expose its engine air inlets after the air launched vehicle has been jettisoned from a host aircraft.

The illustrative embodiments recognize and take into account that typical deployable aerodynamic covers can produce FOD that might be ingested in the air inlets of the air launched vehicles engine.

The illustrative embodiments also recognize and take into account that previous deployable covers are large, expensive to manufacture or operate, or are tied to another mechanism of the host vehicle or air launched vehicle.

The illustrative embodiments also recognize and take into account that the components of typical deployable covers may interfere with the aerodynamic mold line of the air launched vehicle and/or may infringe on fuel storage space of the air launched vehicle.

Thus, the illustrative embodiments provide a less complex, deployable inlet cover mechanism that creates no FOD, has minimal impact to fuel storage volume, and minimal impact to the outer mold line of the air launched vehicle.

Figure 1:
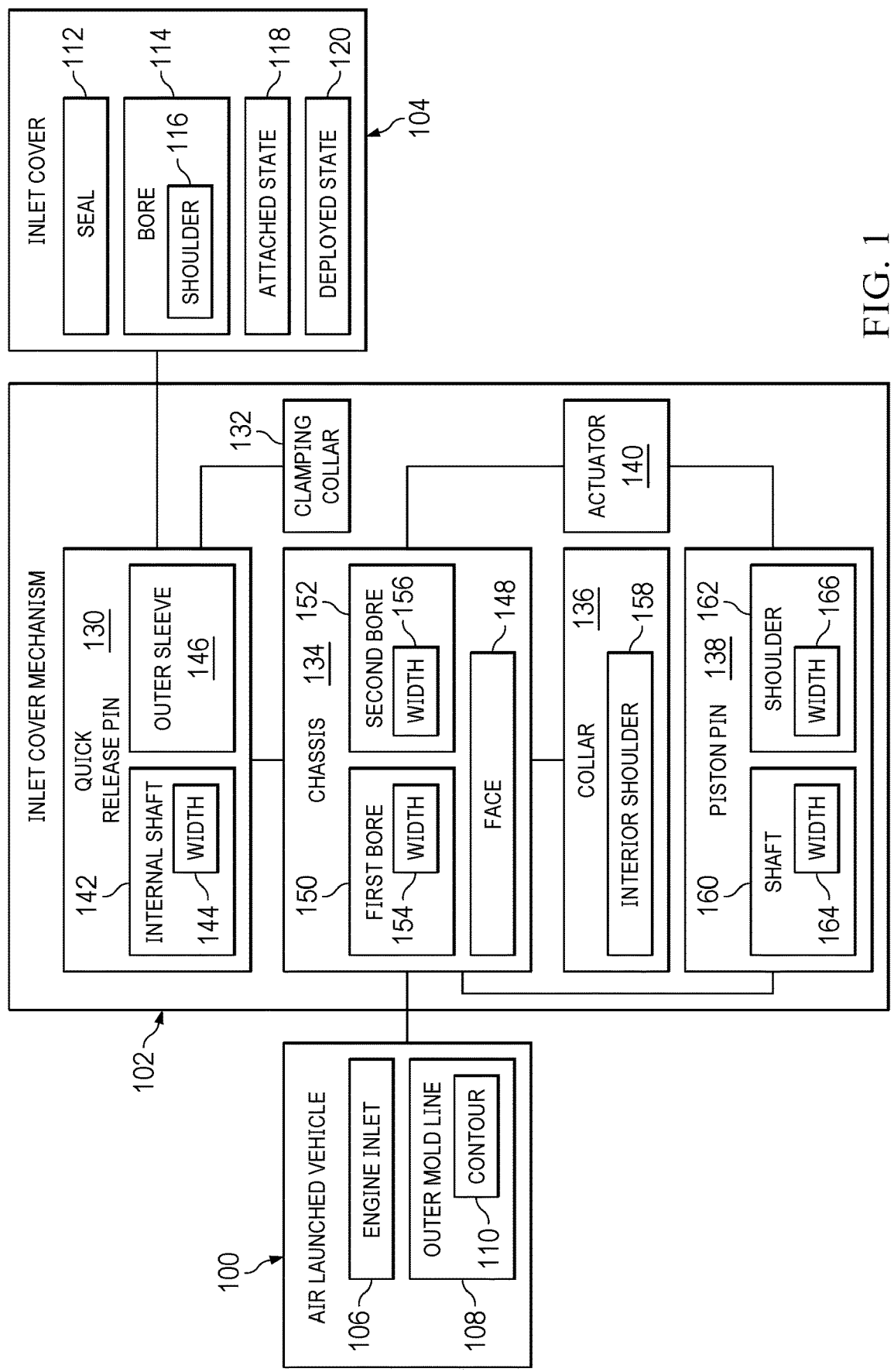
FIG. 1 is an illustration of a block diagram of an air launched vehicle, an inlet cover mechanism, and an inlet cover in accordance with an illustrative embodiment.

With reference now to the figures and, in particular, with reference to FIG. 1, an illustration of a block diagram of air launched vehicle 100, inlet cover mechanism 102, and inlet cover 104 is depicted in accordance with an illustrative embodiment.

Air launched vehicle 100 has engine inlet 106 and outer mold line 108 in this illustrative example. Engine inlet 106 may be one or more openings in air launched vehicle 100 that provides air to the engine of air launched vehicle 100. Outer mold line 108 of air launched vehicle 100 is an aerodynamic shape including contour 110.

Inlet cover mechanism 102 releasably attaches inlet cover 104 to air launched vehicle 100. Inlet cover mechanism 102 operates to attach inlet cover 104 to air launched vehicle 100 and also to jettison inlet cover 104 off of air launched vehicle 100 after air launched vehicle 100 is deployed from a host aircraft.

In this illustrative example, inlet cover 104 includes seal 112 connected to and surrounding a perimeter edge of inlet cover 104. Inlet cover 104 includes bore 114 for engagement with inlet cover mechanism 102. Shoulder 116 within bore 114 abuts inlet cover mechanism 102. Because inlet cover 104 is releasably attached to air launched vehicle 100 by inlet cover mechanism 102, inlet cover 104 has attached state 118 and deployed state 120.

Seal 112 is flexible such that when inlet cover 104 is attached to air launched vehicle 100 by inlet cover mechanism 102, seal 112 provides an air-tight seal between inlet cover 104 and outer mold line 108 of air launched vehicle 100. The flexibility of seal 112 allows inlet cover 104 to follow contour 110 and prevent air from entering engine inlet 106 prior to inlet cover 104 being jettisoned from air launched vehicle 100.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, inlet cover mechanism 102 includes quick release pin 130, clamping collar 132, chassis 134, collar 136, piston pin 138, and actuator 140.

In this illustrative example, quick release pin 130 may be a commercial-off-the-shelf quick release pin that generally includes internal shaft 142 surrounded by outer sleeve 146. Internal shaft has width 144. Internal shaft 142 is operable to move internal ball bearings of quick release pin 130 such that the ball bearings extend past width 144 and past outer sleeve 146. When the ball bearings extend past width 144 and outer sleeve 146, the ball bearings engage collar 136.

In this illustrative example, clamping collar 132 is connected to quick release pin 130. Clamping collar 132 abuts shoulder 116 to secure quick release pin 130 to inlet cover 104.

In this illustrative example, chassis 134 is connected to air launched vehicle 100. The body of chassis 134 includes face 148. Face 148 sits flush with outer mold line 108. Thus face 148 may be contoured to match contour 110. Face 148 may also include mounting holes configured to accept flush mounted mounting hardware, for example screws, such that the hardware does not interrupt outer mold line 108. The body of chassis 134 further includes first bore 150 and second bore 152. First bore 150 is axially aligned with second bore 152. First bore 150 has width 154 and second bore has width 156. Width 154 is greater than width 156. In other words, first bore 150 is wider than second bore 152.

In this illustrative example, collar 136 is connected to chassis 134. Collar 136 is seated in first bore 150. Collar 136 may be threadedly engaged with first bore 150. Collar 136 includes interior shoulder 158. Interior shoulder 158 provides a surface for engagement with the ball bearings of quick release pin 130. When inlet cover 104 is in attached state 118, the ball bearings of quick release pin 130 abut interior shoulder 158 to secure quick release pin 130 (thus, inlet cover 104) to air launched vehicle 100. The depth at which collar 136 is seated within first bore 150 corresponds to the dimensions of quick release pin 130 such that when quick release pin 130 is engaged with collar 136, seal 112 is compressed enough to provide an airtight seal between inlet cover 104 and air launched vehicle 100.

In this illustrative example, piston pin 138 is slidably engaged with chassis 134. Piston pin 138 is seated within second bore 152. Piston pin 138 includes shaft 160 extending from shoulder 162. Shaft 160 has width 164. Shoulder 162 has width 166. Width 166 is greater than width 164. Width 166 of shoulder 162 is less than width 156 of second bore 152 such that piston pin 138 may freely slide within the length of second bore 152. Width 164 matches or is slightly less than width 144 of internal shaft 142 of quick release pin 130. When in attached state 118, shaft 160 is seated within outer sleeve 146 and may abut internal shaft 142. Width 166 of shoulder 162 of piston pin 138 is greater than width 144 of internal shaft 142 of quick release pin 130. Quick release pin 130 and piston pin 138 are axially aligned.

In this illustrative example, actuator 140 is connected to chassis 134. Actuator 140 may be a commercial-off-the-shelf pin pusher actuator, for example, a pyrotechnic actuator classified as HD 1.4S that does not require any special handling. Upon activation of actuator 140, actuator 140 contacts piston pin 138 resulting in piston pin 138 contacting and pushing internal shaft 142 such that the ball bearings of quick release pin 130 disengage from interior shoulder 158 of collar 136 allowing inlet cover 104 to separate from air launched vehicle 100.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
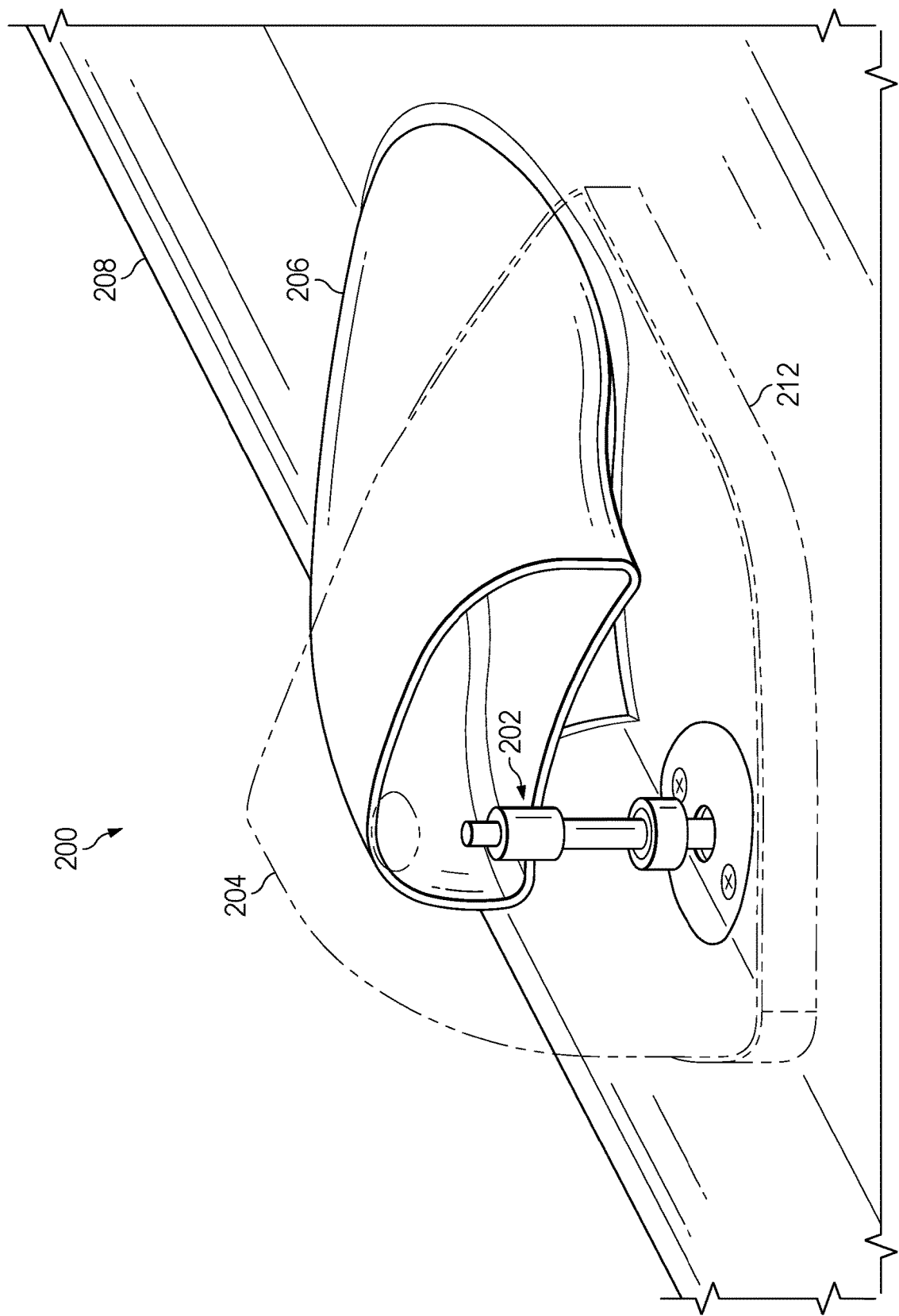
FIG. 2 is an illustration of an inlet cover attached to an air launched vehicle using an inlet cover mechanism in accordance with an illustrative embodiment.

With reference next to FIG. 2, an illustration of an inlet cover releasably attached to an air launched vehicle with an inlet cover mechanism is depicted in accordance with an illustrative example. In this illustrative example, air launched vehicle 200 is an example of one implementation for air launched vehicle 100 shown in block form in FIG. 1, inlet cover mechanism 202 is an example of one implementation for inlet cover mechanism 102 shown in block form in FIG. 1, and inlet cover 204 is an example of one implementation for inlet cover 104 shown in block form in FIG. 1.

As depicted, air launched vehicle 200 includes engine inlet 206. An aerodynamic shape of air launched vehicle 200 is depicted by outer mold line 208.

Inlet cover 204 is releasably attached to air launched vehicle 200 using inlet cover mechanism 202. In this illustrative example, inlet cover 204 is an example of one implementation for inlet cover 104 shown in block form in FIG. 1. In this illustrative example, inlet cover mechanism 202 is an example of one implementation for inlet cover mechanism 102 shown in block form in FIG. 1.

Inlet cover 204 includes seal 212 connected to and surrounding a perimeter edge of inlet cover 204. Seal 212 provides a flexible interface between the perimeter edge of inlet cover 204. The flexibility of seal 212 allows inlet cover 204 to follow the contour of outer mold line 208 and prevent air from entering engine inlet 206 prior to inlet cover 204 being deployed from air launched vehicle 200.

Figure 3:
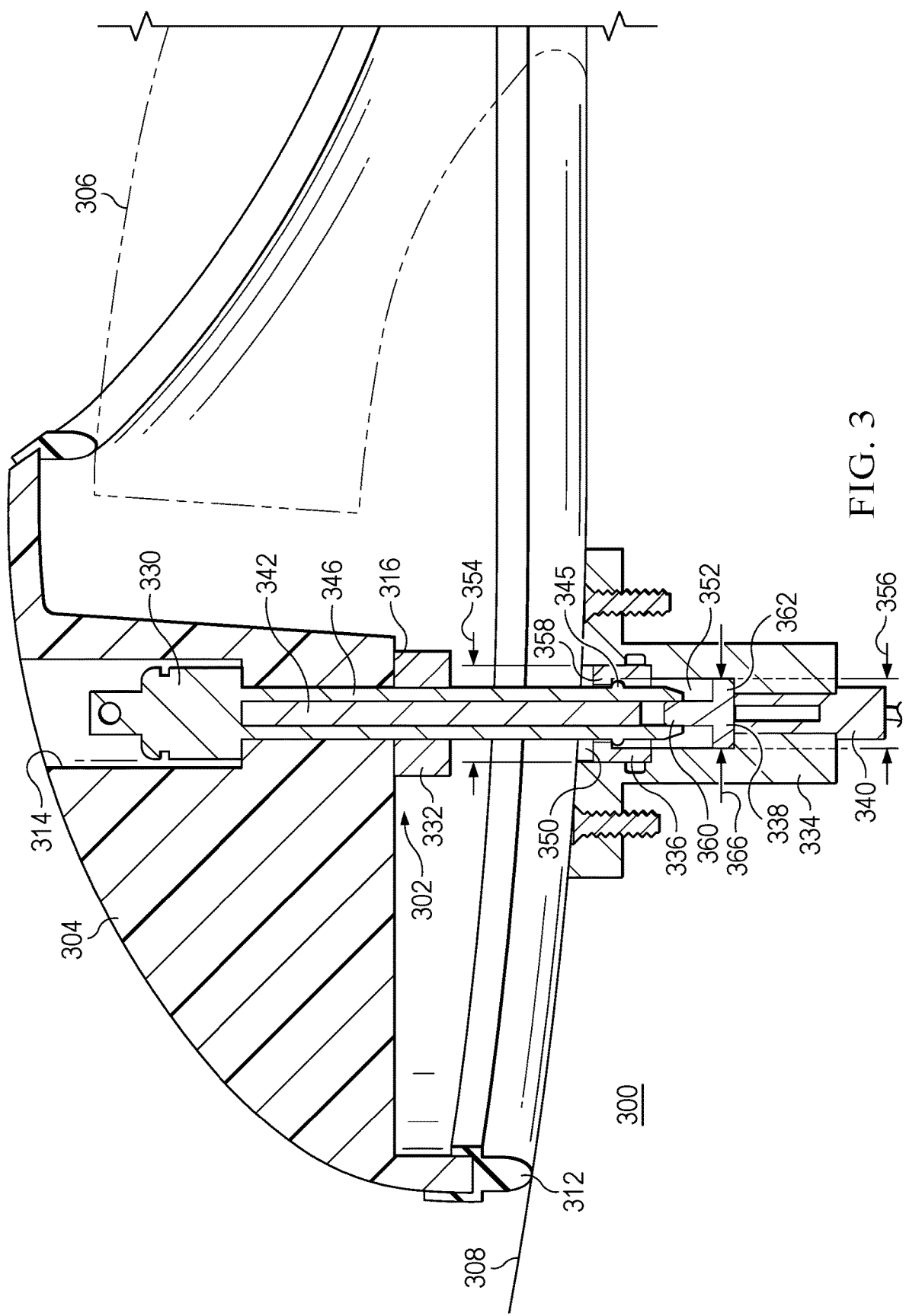
FIG. 3 is an illustration of an inlet cover attached to an air launched vehicle using an inlet cover mechanism in accordance with an illustrative embodiment.
Figure 4:
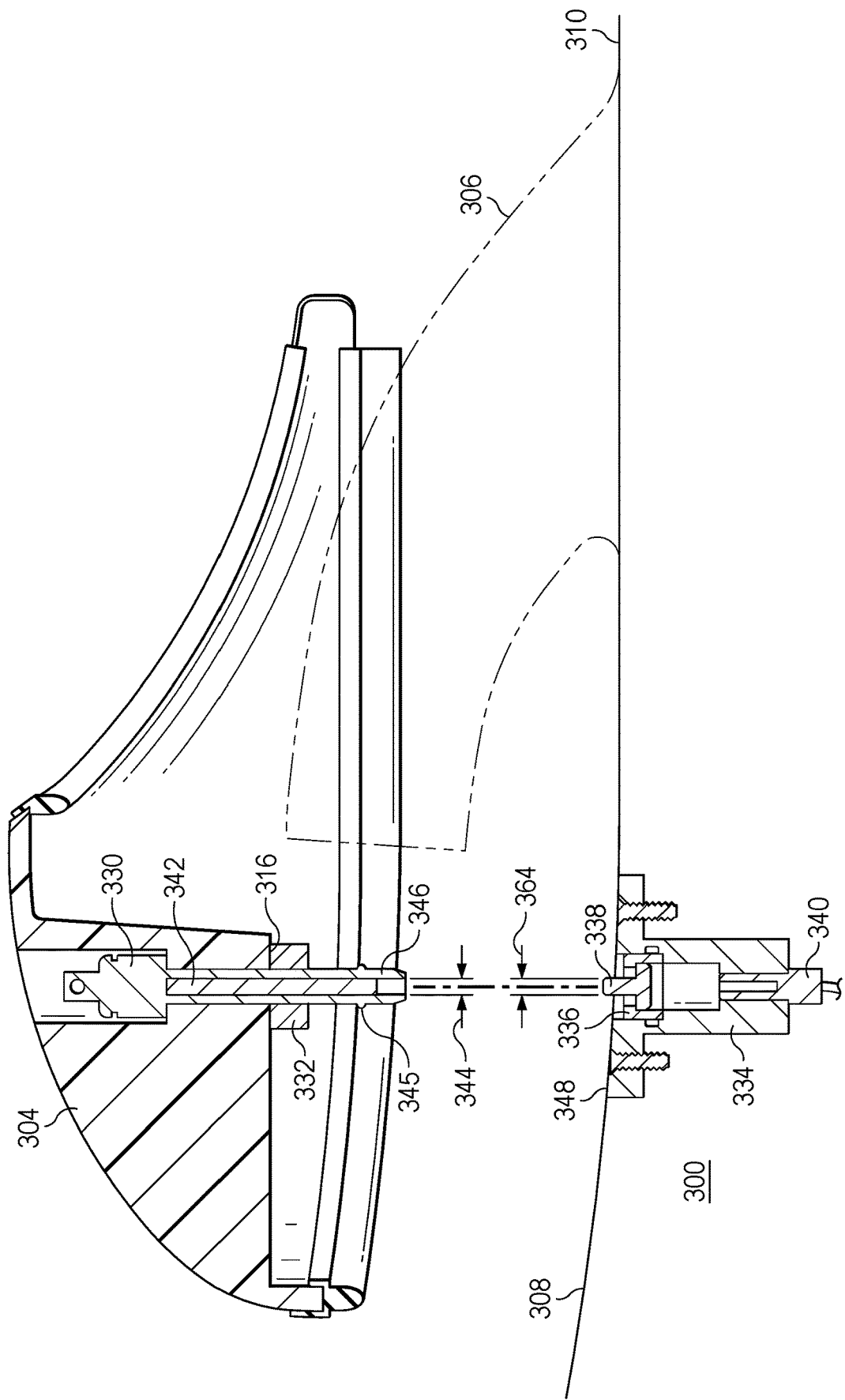
FIG. 4 is an illustration of an inlet cover deployed from an air launched vehicle using an inlet cover mechanism in accordance with an illustrative embodiment.

With reference next to FIGS. 3-4, illustrations of an inlet cover attached and deployed from an air launched vehicle using an inlet cover mechanism are depicted in accordance with an illustrated example. In this illustrative example, FIG. 3 depicts inlet cover 304 releasably attached to air launched vehicle 300 using inlet cover mechanism 302. In this illustrative example, FIG. 4 depicts inlet cover 304 detached or deployed from air launched vehicle 300 using inlet cover mechanism 302. Air launched vehicle 300, inlet cover mechanism 302, and inlet cover 304 are examples of one implementation for air launched vehicle 100, inlet cover mechanism 102, and inlet cover 104, respectively, shown in block form in FIG. 1.

Air launched vehicle 300 includes engine inlet 306 and outer mold line 308 in these illustrative examples. Engine inlet 306 may be one or more openings in air launched vehicle 300 that provides air to the engine of air launched vehicle 300. Outer mold line 308 of air launched vehicle 300 is an aerodynamic shape having contour 310.

Inlet cover mechanism 302 releasably attaches inlet cover 304 to air launched vehicle 300. Inlet cover mechanism 302 operates to attach inlet cover 304 to air launched vehicle 300 and also to deploy inlet cover 304 away from air launched vehicle 300 after air launched vehicle 300 is jettisoned from a host aircraft.

In these illustrative examples, inlet cover 304 includes seal 312 connected to and surrounding a perimeter edge of inlet cover 304. Inlet cover 304 includes bore 314 for engagement with inlet cover mechanism 302. Shoulder 316 within bore 314 abuts inlet cover mechanism 302.

Seal 312 is flexible such that when inlet cover 304 is attached to air launched vehicle 300, seal 312 provides an air-tight seal between inlet cover 304 and outer mold line 308 of air launched vehicle 300. The flexibility of seal 312 allows inlet cover 304 to follow contour 310 and prevent air from entering engine inlet 306 prior to the deployment of inlet cover 304 from air launched vehicle 300.

In these illustrative examples, inlet cover mechanism 302 includes quick release pin 330, clamping collar 332, chassis 334, collar 336, piston pin 338, and actuator 340.

In these illustrative examples, quick release pin 330 includes internal shaft 342 surrounded by outer sleeve 346. Internal shaft has width 344. Internal shaft 342 is operable to move internal ball bearings 345 of quick release pin 330 such that ball bearings 345 extend past outer sleeve 346. When ball bearings 345 extend past outer sleeve 346, ball bearings 345 engage collar 336.

In these illustrative examples, clamping collar 332 is connected to quick release pin 330. Clamping collar 332 abuts shoulder 316 to secure quick release pin 330 to inlet cover 304.

In these illustrative examples, chassis 334 is connected to air launched vehicle 300. The body of chassis 334 includes face 348. Face 348 sits flush with outer mold line 308. Thus face 348 may be contoured to match contour 310. The body of chassis 334 further includes first bore 350 and second bore 352. First bore 350 is axially aligned with second bore 352. First bore 350 has width 354 and second bore has width 356. Width 354 is greater than width 356. In other words, first bore 350 is wider than second bore 352.

In these illustrative examples, collar 336 is connected to chassis 334. Collar 336 is seated in first bore 350. Collar 336 may be threadedly engaged with first bore 350. Collar 336 includes interior shoulder 358. Interior shoulder 358 provides a surface for engagement with ball bearings 345 of quick release pin 330. When inlet cover 304 is in attached state 118, as depicted in FIG. 3, ball bearings 345 abut interior shoulder 358 to secure quick release pin 330 and subsequently, inlet cover 304, to air launched vehicle 300. The depth at which collar 336 is seated within first bore 350 corresponds to the dimensions of quick release pin 330 such that when quick release pin 330 is engaged with collar 336, seal 312 is compressed to provide an airtight seal between inlet cover 304 and air launched vehicle 300.

In these illustrative examples, piston pin 338 is slidably engaged with chassis 334. Piston pin 338 is seated within second bore 352. Piston pin 338 includes shaft 360 extending from shoulder 362. Shaft 360 has width 364. Shoulder 362 has width 366. Width 366 is greater than width 364. Width 366 of shoulder 362 is less than width 356 of second bore 352 such that piston pin 338 may freely slide through the length of second bore 352. Width 366 of shoulder 362 is larger than width 354 of first bore 350 so that when the inlet cover is in deployed state 120, as depicted in FIG. 4, first bore 350 traps piston in 338 within chassis 334 and prevents piston pin 338 from becoming FOD.

Width 364 of shaft 360 of piston pin 338 matches or is slightly less than width 344 of internal shaft 342 of quick release pin 330. When in attached state 118, as depicted in FIG. 3, shaft 360 is seated within outer sleeve 346 and may abut internal shaft 342. Width 366 of shoulder 362 of piston pin 338 is greater than width 344 of internal shaft 342 of quick release pin 330. This is a backup feature such that, during deployment of the inlet cover, if the quick releases pin breaks down, piston pin 338 still contacts quick release pin 330 to ensure separation of the inlet cover from the air launched vehicle.

In these illustrative examples, actuator 340 is connected to chassis 334. Actuator 340 may be a commercial-off-the-shelf pin pusher actuator. Upon activation of actuator 340, actuator 340 contacts piston pin 338 resulting in piston pin 338 contacting and pushing internal shaft 342 such that ball bearings 345 of quick release pin 330 disengage from interior shoulder 358 of collar 336 allowing inlet cover 304 to separate from air launched vehicle 300.

Figure 5:
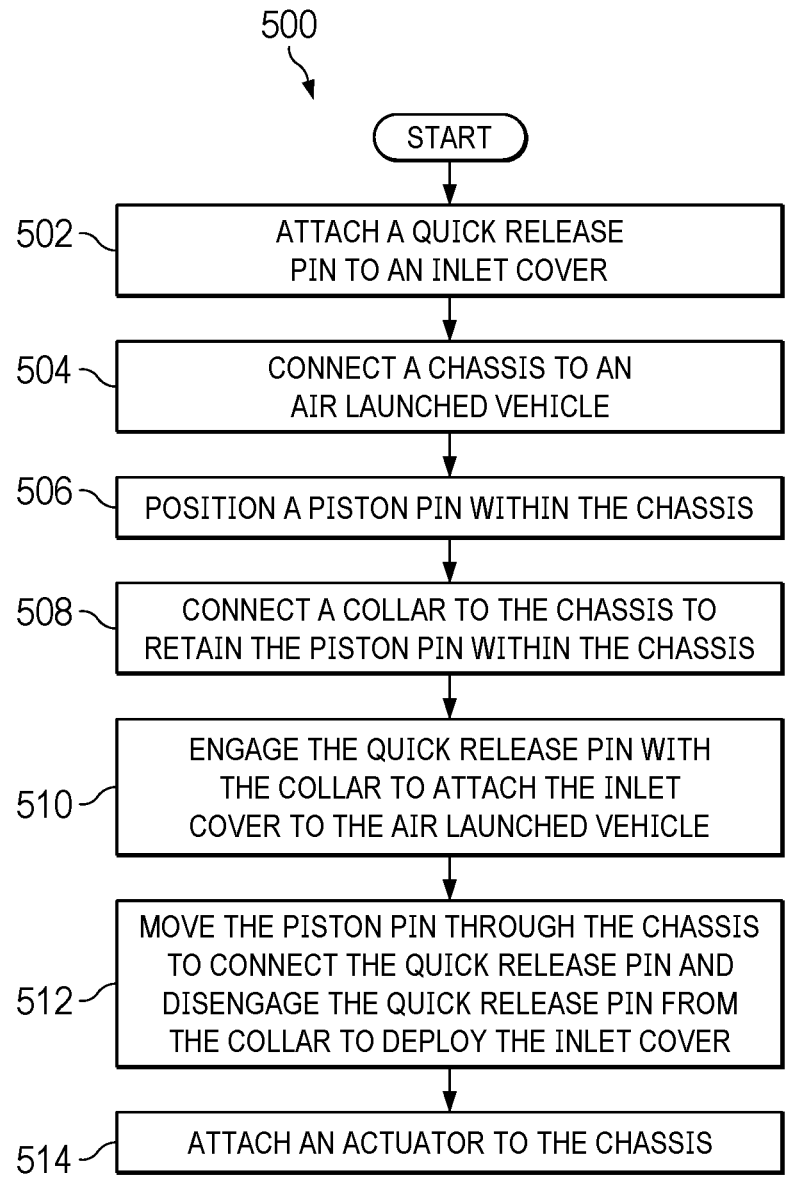
FIG. 5 is an illustration of a flowchart of a process for attaching and deploying an inlet cover of an air launched vehicle in accordance with an illustrative embodiment.

With reference next to FIG. 5, an illustration of a flowchart of a process 500 for attaching and deploying an inlet cover of an air launched vehicle. The method depicted in FIG. 5 may be used in conjunction with inlet cover mechanism depicted in FIGS. 1-4.

The process begins by attaching a quick release pin to an inlet cover (operation 502). The process connects the chassis to an air launched vehicle (operation 504). The process then positions a piston pin within the chassis (operation 506). The process then connects a collar to the chassis to retain the piston pin within the chassis (operation 508). Next, the process engages the quick release pin with the collar to attach the inlet cover to the air launched vehicle (operation 510). At operation 512, the piston pin moves through the chassis to contact the quick release pin and disengage the quick release pin from the collar to deploy the inlet cover. Moving the piston pin through the chassis to contact the quick release pin may comprise a shaft of the piston pin contacting an internal shaft of the quick release pin. At operation 514, an actuator is attached to the chassis.

In some alternative implementations of an illustrative example, the function or functions noted in the blocks may occur out of the order noted in the Figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
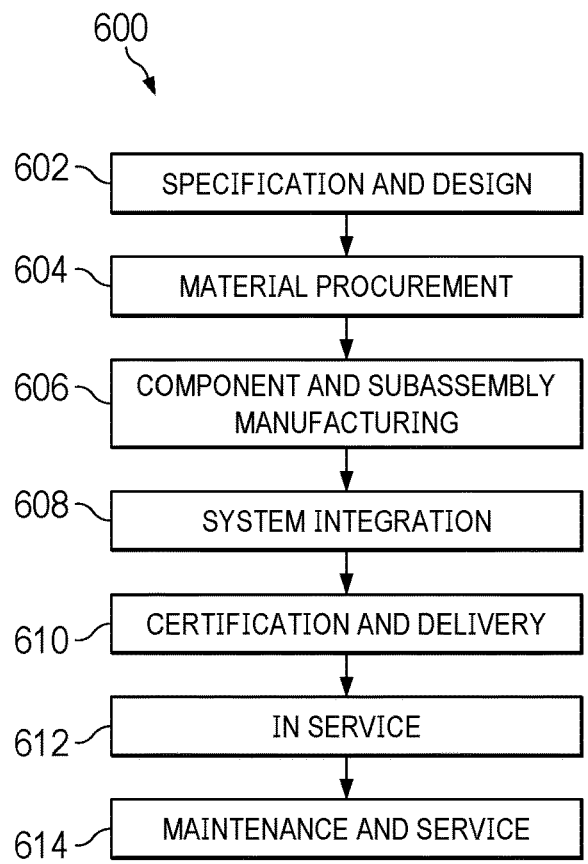
FIG. 6 is an illustration of a block diagram of an aircraft manufacturing and service method in accordance with an illustrative embodiment.
Figure 7:
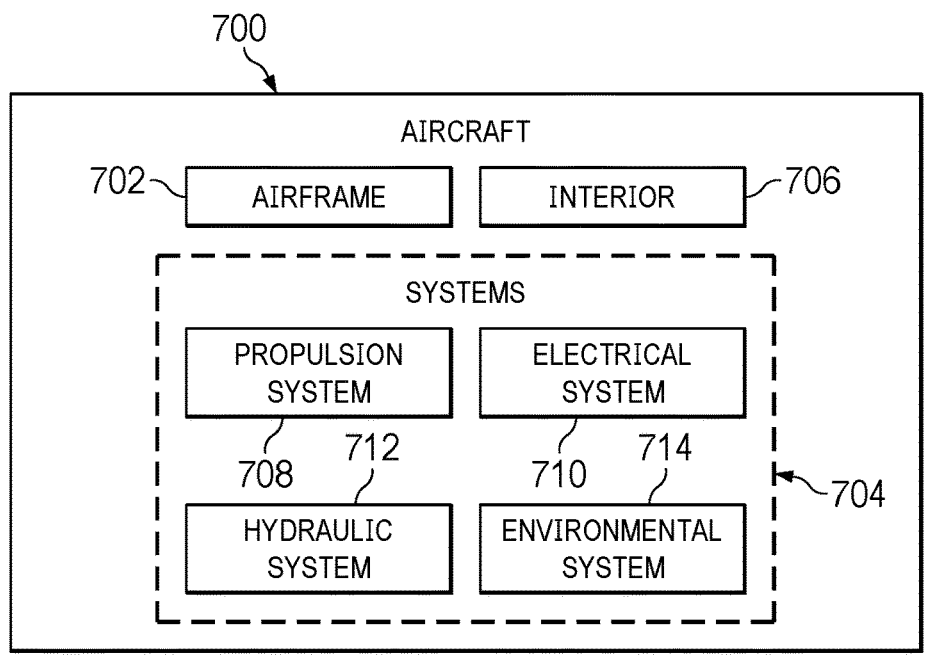
FIG. 7 is an illustration of a block diagram of an aircraft in which an illustrative embodiment may be implemented.

The illustrative embodiments of the disclosure may be further described in the context of aircraft manufacturing and service method 600 as shown in FIG. 6 and aircraft 700 as shown in FIG. 7. Turning first to FIG. 6, an illustration of a block diagram of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance, service, or inspection.

Inlet cover mechanism 102 may be installed on an aircraft during component and subassembly manufacturing 606. In addition, Inlet cover mechanism 102 may be retrofitted onto aircraft 700 in FIG. 7 during routine maintenance and service 614 as part of a modification, reconfiguration, or refurbishment of aircraft 700 in FIG. 7.

Each of the processes of aircraft manufacturing and service method 600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 7, an illustration of a block diagram of an aircraft is depicted in which an illustrative embodiment may be implemented. In this example, aircraft 700 is produced by aircraft manufacturing and service method 600 in FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6. In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while aircraft 700 is in service 612, during maintenance and service 614, inclusive of inspection, in FIG. 6, or both. The use of a number of the different illustrative embodiments may substantially expedite the assembly of aircraft 700, reduce the cost of aircraft 700, or both expedite the assembly of aircraft 700 and reduce the cost of aircraft 700.

A powered air launched vehicle requires a deployable cover to expose its engine air inlets after the air launched vehicle has been jettisoned from a host aircraft. The proposed invention accomplishes the task without creating foreign object debris, having minimal impact to fuel volume space of the air launched vehicle, and imparting minimal impact to the outer mold line of the air launched vehicle.

The disclosed inlet cover mechanism incorporates the use of a pyrotechnic actuator that is classified as HD 1.4S and therefore does not require any special handling. The disclosed inlet cover mechanism produces no foreign object debris that could be ingested in the engine inlets of an air launched vehicle. The disclosed inlet cover mechanism relies on a commercial off the shelf quick release pin and a pin pusher actuator which reduces cost and complexity.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An inlet cover apparatus for an air launched vehicle, comprising: a quick release pin connected to an inlet cover of the air launched vehicle; a chassis directly connected to the air launched vehicle; a collar connected to the chassis, the collar releasably engageable with the quick release pin; and a piston pin slidably engaged within the chassis, the piston pin configured to contact the quick release pin, wherein the chassis has a first bore and a second bore, the first bore wider than the second bore, the collar seated within the first bore and the piston pin seated within the second bore.

2. The apparatus of claim 1 further comprising an actuator connected to the chassis, the actuator configured to contact the piston pin upon activation.

3. The apparatus of claim 2, wherein the piston pin is seated within a bore of the chassis and positioned between the quick release pin and the actuator.

4. The apparatus of claim 1, wherein the quick release pin and the piston pin are axially aligned.

5. The apparatus of claim 1, wherein the quick release pin comprises an internal shaft having a first width and the piston pin comprises a shoulder having a second width, the second width greater than the first width.

6. The apparatus of claim 1 further comprising a seal connected to a perimeter edge of inlet cover of the air launched vehicle.

7. The apparatus of claim 1, wherein the collar is threadably engaged with a bore in the chassis.

8. The apparatus of claim 7, wherein the collar is positioned at a depth in the bore such that when the collar is engaged with the quick release pin, the inlet cover of the air launched vehicle is sealed to the air launched vehicle.

9. The apparatus of claim 1 further comprising a clamping collar, wherein the clamping collar captures the quick release pin to a shoulder formed in the inlet cover of the air launched vehicle.

10. The apparatus of claim 1, wherein the collar comprises an interior shoulder for engagement with the quick release pin.

11. The apparatus of claim 1, wherein the inlet cover of the air launched vehicle has an attached state and a deployed state and wherein when in the attached state, the quick release pin is engaged with the collar and the piston pin is seated within an outer sleeve of the quick release pin.

12. A system for attaching and deploying an inlet cover of an air launched vehicle, comprising:
an inlet cover;
a quick release pin connected to the inlet cover;
a chassis connected to an air launched vehicle;
a collar connected to the chassis in a first bore of the chassis; and
a piston pin seated in a second bore of the chassis, the piston pin axially aligned with the quick release pin;
wherein the quick release pin is releasably engageable with an interior shoulder of the collar.

13. The system of claim 12 further comprising an actuator connected to the chassis, the actuator configured to contact the piston pin upon activation.

14. The system of claim 12 wherein the quick release pin comprises an internal shaft having a first width and the piston pin comprises a shoulder having a second width, the second width greater than the first width.

15. The system of claim 12 further comprising a seal connected to a perimeter edge of the inlet cover.

16. The system of claim 12 further comprising a clamping collar, wherein the clamping collar captures the quick release pin to a shoulder formed in the inlet cover.

17. A method for attaching and deploying an inlet cover of an air launched vehicle, the method comprising: attaching a quick release pin to an inlet cover, connecting a chassis to an air launched vehicle; positioning a piston pin within the chassis; connecting a collar to the chassis to retain the piston pin within the chassis; engaging the quick release pin with the collar to attach the inlet cover to the air launched vehicle; and moving the piston pin through the chassis to contact the quick release pin and disengage the quick release pin from the collar to deploy the inlet cover, wherein moving the piston pin through the chassis to contact the quick release pin further comprises a shaft of the piston pin contacting an internal shaft of the quick release pin.

18. The method of claim 17 further comprising attaching an actuator to the chassis and wherein moving the piston pin through the chassis is a result of activation of the actuator.

* * * * *